Nov. 4, 1958  S. H. S. RAUB ET AL  2,859,021
GAS ABSORBER DISTRIBUTION
Filed March 28, 1955

INVENTORS
SAMUEL H. S. RAUB
JOSEPH F. REVILOCK
CURRY E. FORD
BY
Richard S. Shreve
ATTORNEY

United States Patent Office 2,859,021
Patented Nov. 4, 1958

2,859,021

GAS ABSORBER DISTRIBUTION

Samuel H. S. Raub, Joseph F. Revilock, and Curry E. Ford, Bay Village, Ohio, assignors to Union Carbide Corporation, a corporation of New York Application March 28, 1955, Serial No. 496,975

5 Claims. (Cl. 261—112)

This invention relates to gas absorber distribution, and more particularly to the distribution of weak acid or other weak solution of gas being absorbed in falling film type of apparatus for the absorption of hydrogen chloride or other gases, in which the weak solution and the gas being absorbed flow downwardly in concurrent flow relation through vertical water-cooled wetted wall columns but in countercurrent relation to the upward flow of cooling water in the shell, and unabsorbed gas from the bottom of the column passes upward in countercurrent relation to the feed water for the process through a tail gas scrubber integrated with the exchanger. Weak solution from the tail gas scrubber enters the distribution section of the absorber through a weak solution inlet, and overflows through notched weir tubes to the top of the absorber column.

Gas absorbers of this type have fallen short of maximum performance as to capacity of throughput and yield strength of product, and we have discovered that the difficulty is due to unequal distribution of weak solution. It is therefore the main object of the present invention to improve the distribution of weak solution in gas absorbers of this type.

Heretofore the weak solution from the tail gas scrubber has been introduced to the distribution section of the absorber at one or at the most two external connections thereof, and it is a more specific object of the invention to spread the introduction over a large number of ports uniformly spaced around the periphery of the distribution section, and to provide a readily cleaned ring-shaped manifold to effect more nearly equal flow of weak solution to every tube.

The weir tubes also contributed to the uneven distribution. The overflow notches had been provided with sides tapering to a sharp bottom, and being machined were subject to variation due to wheel run out. Furthermore the weir tubes being screwed into the tube sheet in assembly, it was difficult to maintain accurate height of the bottom of the notch above the top of the tube sheet. Also, although the notches were cut in a direction tangential to the weir tube, the proportions of the notches were such that somewhat radial flow resulted. We have discovered that as a practical limit neither the height nor the area of the unobstructed opening viewed radially from the outside shall exceed 50% of that of the notch area at either the outer or inner tube surfaces, whichever is the lesser.

Other objects of the invention are therefore to improve the accuracy of the weir tube notches, to provide the weir tube notches with coplanar flat bottoms, to provide the weir tubes with bottom shoulders to engage the tube sheet, and to proportion the weir tube notches to insure tangential flow therethrough to cause the liquid to uniformly wet the inner surface of all of the tubes over a wide range of flow rate.

According to the present invention the distribution section is provided with an annular chamber having a multiplicity of outlet ports uniformly spaced around the inner wall thereof, and the weir tubes are provided with overflow notches with the bottoms thereof uniformly spaced above the tube plate and the notches are proportioned to produce tangential inward flow. Preferably the annular chamber is formed by a distributor ring adapted to fit inside the distribution section above the tube plate and surrounding the inner tubes and having an annular recess in communication with the weak solution inlet, the outlet ports being formed in the distributor ring. Preferably the weir tube notches have coplanar flat bottoms, and the height and the area of the radial projection of each notch being not over half of that at either the inner or outer tube surface.

Figure 1:
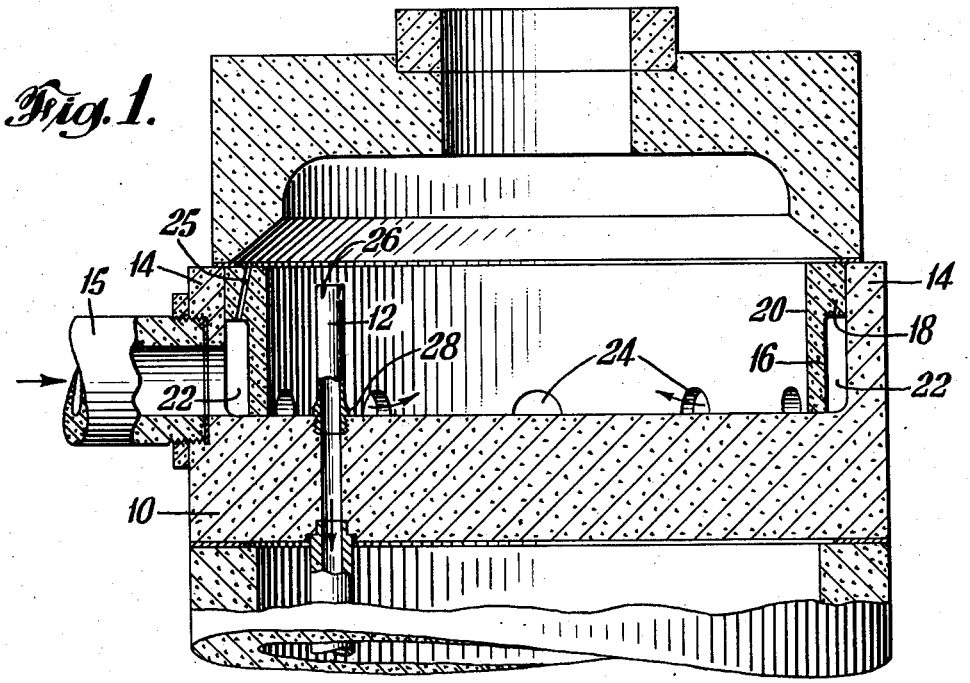
Fig. 1 is a vertical section through the distribution section of a gas absorber of the falling film type provided with weak solution distribution means according to the present invention.

The absorber distribution section comprises a tube plate 10 which is bored and threaded to receive a plurality of upstanding weir tubes 12. The tube plate 10 is preferably provided with an upstanding peripheral flange 14 into which is threaded a pipe 15 forming a weak solution inlet located above the plate 10.

The annular distribution chamber is formed by a distributor ring 16 comprising an annular horizontal flange 18 snugly fitting inside the tube plate flange 14, and a depending vertical cylindrical flange 20 which rests on the top of the tube plate 10 but is uniformly spaced inwardly therefrom, leaving an annular recess 22 in communication with the inlet 15. The bottom of the ring 16 is provided with a number of uniformly spaced outlets 24, there being ten of semicircular shape in the embodiment shown. The upper or horizontal flange 18 is provided with a vent 25 to prevent air lock. There is thus provided a readily cleaned ring-shaped distributor manifold to effect more nearly equal flow of weak acid from the inlet 15 to every weir tube 12.

Figure 2:
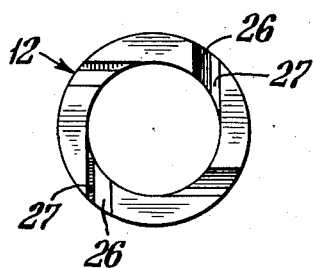
Fig. 2 is a plan of the weir tube shown in Fig. 1.
Figure 4:
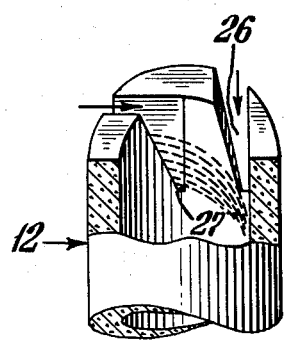
Fig. 4 is a perspective view looking down at an angle onto the top of the inner tube shown in Figs. 2 and 3, partly broken away and shown in section.
Figure 3:
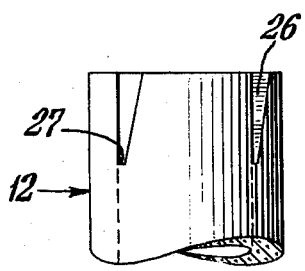
Fig. 3 is a side elevation of the same.

The weir tubes 12 are provided with overflow notches 26 in their upper rims. These notches are disposed tangentially to the inner surface of the weir tubes, four equally spaced notches being shown in Fig. 2. These notches are provided with coplanar flat bottoms 27, and the weir tubes 12 are provided with annular bottom shoulders 28 which abut the top of the tube plate 10 and maintain the bottom 27 of the notches a uniform distance above the top of the tube plate 10.

The notches 26 are so proportioned and shaped that the liquid through the absorber will uniformly wet the inner surface of all of the tubes over a wide range of flow rate. This is accomplished by the tangential disposition of the notches 26, and the provision of the height and area of the radial projection of the notch being not over half of that at either the inner or the outer tube surface.

We claim:

1. In a gas absorber of the falling film type comprising a distribution section having a horizontal tube plate and a weak solution inlet, a plurality of thick walled upstanding vertical weir tubes in said tube plate, said weir tubes having narrow open topped overflow notches in their upper rims, each notch having one side surface in a vertical plane tangent to the inner surface of its weir tube, each notch having the other side surface thereof in a plane converging downwardly at a small acute dihedral angle to said vertical plane, the top of each notch being substantially as wide as the wall thickness of its weir tube.

2. In a gas absorber of the falling film type comprising a distribution section having a tube plate and a weak solution inlet thereabove, said tube plate carrying a plurality of upstanding weir tubes, a distributor ring having an annular horizontal flange adapted to fit inside the distribution section above the tube plate and surrounding the weir tubes and having below said annular horizontal flange an annular recess forming with the inner wall of said distribution section an annular distribution chamber in communication with said weak solution inlet, said distributor ring having a plurality of outlet ports formed in the bottom thereof uniformly spaced around the inner periphery thereof.

3. In a gas absorber of the falling film type comprising a distribution section having a horizontal tube plate and a weak solution inlet, a plurality of upstanding vertical thick walled weir tubes in said tube plate, said weir tubes having narrow open topped overflow notches in their upper rims, each notch having one side surface in a vertical plane tangent to the inner surface of its weir tube, each notch having the other side surface thereof in a plane converging downwardly at a small acute dihedral angle to said vertical plane, the top of each notch being substantially as wide as the wall thickness of its weir tube, the sides of the notches in each weir tube terminating in bottoms located in a plane normal to the axis of its weir tube, and means for mounting said weir tubes to space the bottoms of their notches uniformly above said tube plate.

4. In a gas absorber of the falling film type comprising a distribution section having a horizontal tube plate and a weak solution inlet, a plurality of upstanding vertical thick walled weir tubes in said tube plate, said weir tubes having narrow open topped overflow notches in their upper rims, each notch having one side surface in a vertical plane tangent to the inner surface of its weir tube, each notch having the other side surface thereof in a plane converging downwardly at a small acute dihedral angle to said vertical plane, the top of each notch being substantially as wide as the wall thickness of its weir tube, the sides of the notches in each weir tube terminating in bottoms located in a plane normal to the axis of its weir tube, each of said weir tubes having an annular shoulder on the lower portion thereof for engaging said weir plate to space the bottoms of their overflow notches uniformly from the top of said tube plate.

5. In a gas absorber of the falling film type comprising a distribution section having a tube plate and a weak solution inlet thereabove, a distributor ring adapted to fit inside said distribution section and having an annular recess forming with the inner wall of said distribution section an annular distribution chamber, said distribution ring having a plurality of ports uniformly spaced around the inner periphery of said ring, and a plurality of upstanding vertical thick walled weir tubes in said tube plate, said weir tubes having narrow open topped overflow notches in their upper rims, each notch having one side surface in a vertical plane tangent to the inner surface of its weir tube, each notch having the other side surface thereof in a plane converging downwardly at a small acute dihedral angle to said vertical plane, the top of each notch being substantially as wide as the wall thickness of its weir tube, the sides of the notches in each weir tube terminating in bottoms located in a plane normal to the axis of its weir tube, the height and the area of the radial projection of each notch being not over half of that at either the inner or the outer tube surface, and means for mounting said weir tubes to space the bottoms of their notches uniformly above said tube plate.

References Cited in the file of this patent

UNITED STATES PATENTS

| Number | Name | Date |
|---|---|---|
| 662,612 | Weightman | Nov. 27, 1900 |
| 1,309,803 | Housum | July 15, 1919 |
| 1,522,366 | Hiller | Jan. 6, 1925 |
| 1,867,136 | Campbell | July 12, 1932 |
| 2,139,827 | Johnstone | Dec. 13, 1938 |
| 2,233,019 | Linderman | Feb. 25, 1941 |
| 2,344,560 | Palkin et al. | Mar. 21, 1944 |
| 2,682,394 | Guthrie et al. | June 29, 1954 |